& Bramblett

United States Patent [19]

Okaya

[11] 4,089,341
[45] May 16, 1978

[54] CONNECTOR METHOD AND APPARATUS FOR COUPLING TWO SYSTEMS TOGETHER WHILE EXCLUDING THE ENVIRONMENT FROM THE SYSTEM INTERIORS

[75] Inventor: Akira Okaya, New Canaan, Conn.

[73] Assignee: G. Kendall Parmelee, Riverside, Conn.

[21] Appl. No.: 539,400

[22] Filed: Jan. 8, 1975

[51] Int. Cl.$^2$ ............................................. F16K 17/40
[52] U.S. Cl. ................................. 137/68 R; 137/614; 251/148
[58] Field of Search ................ 251/148, 152; 285/352; 137/68 R, 318, 614, 614.01, 614.04, 797

[56] References Cited

U.S. PATENT DOCUMENTS

| | | | |
|---|---|---|---|
| 2,120,677 | 6/1938 | Oliver | 137/614.01 |
| 2,335,832 | 11/1943 | Williams | 137/614.01 |
| 2,868,563 | 1/1959 | Wood | 137/614.04 |
| 2,933,333 | 4/1960 | Bredtschneider et al. | 137/68 R |
| 3,245,428 | 4/1966 | Klimak et al. | 137/614.01 |
| 3,294,359 | 12/1966 | Bauer | 251/148 |
| 3,391,951 | 7/1968 | Miller | 137/68 R |
| 3,624,755 | 11/1971 | Lambert | 137/614.04 |
| 3,831,984 | 8/1974 | Kutina et al. | 285/352 |

Primary Examiner—William R. Cline
Assistant Examiner—H. Jay Spiegel
Attorney, Agent, or Firm—Parmelee, Johnson, Bollinger & Bramblett

[57] ABSTRACT

Connector method and apparatus for coupling together two systems or combinations of systems, for example, vessels such as pipes, conduits, chambers, tanks or the like to provide intercommunication between them while automatically excluding the environment from the system interiors during and after the coupling operation and while preventing any dilution of or loss of the fluid or vacuum within the respective system interiors. The connector apparatus of the present invention includes a male connector element, coupled to a first system, defining a conduit which communicates with the interior of this first system and having a nonplanar sealing surface which forms an apex. A female connector element is coupled to a second system and defines a conduit which communicates with the interior of this second system. The female connector element also has a sealing surface adapted to engage with the male sealing surface, and at least one of these sealing surfaces is deformable.

The female connector element sealing surface is adapted to engage the nonplanar male connector sealing surface initially at the male connector apex and subsequently, upon connector element deformation, at a progressively larger contact area about the male connector apex. The progressive sealing surface engagement from the male connector apex to a larger contact area about the apex progressively increases the contact area of sealing interengagement and progressively expels and excludes the environment from this area.

Valve means are also provided for defining an intercommunicating opening between the conduits which communicate with the respective first and second systems after the environment has been expelled and excluded from the contact area of sealing interengagement.

23 Claims, 13 Drawing Figures

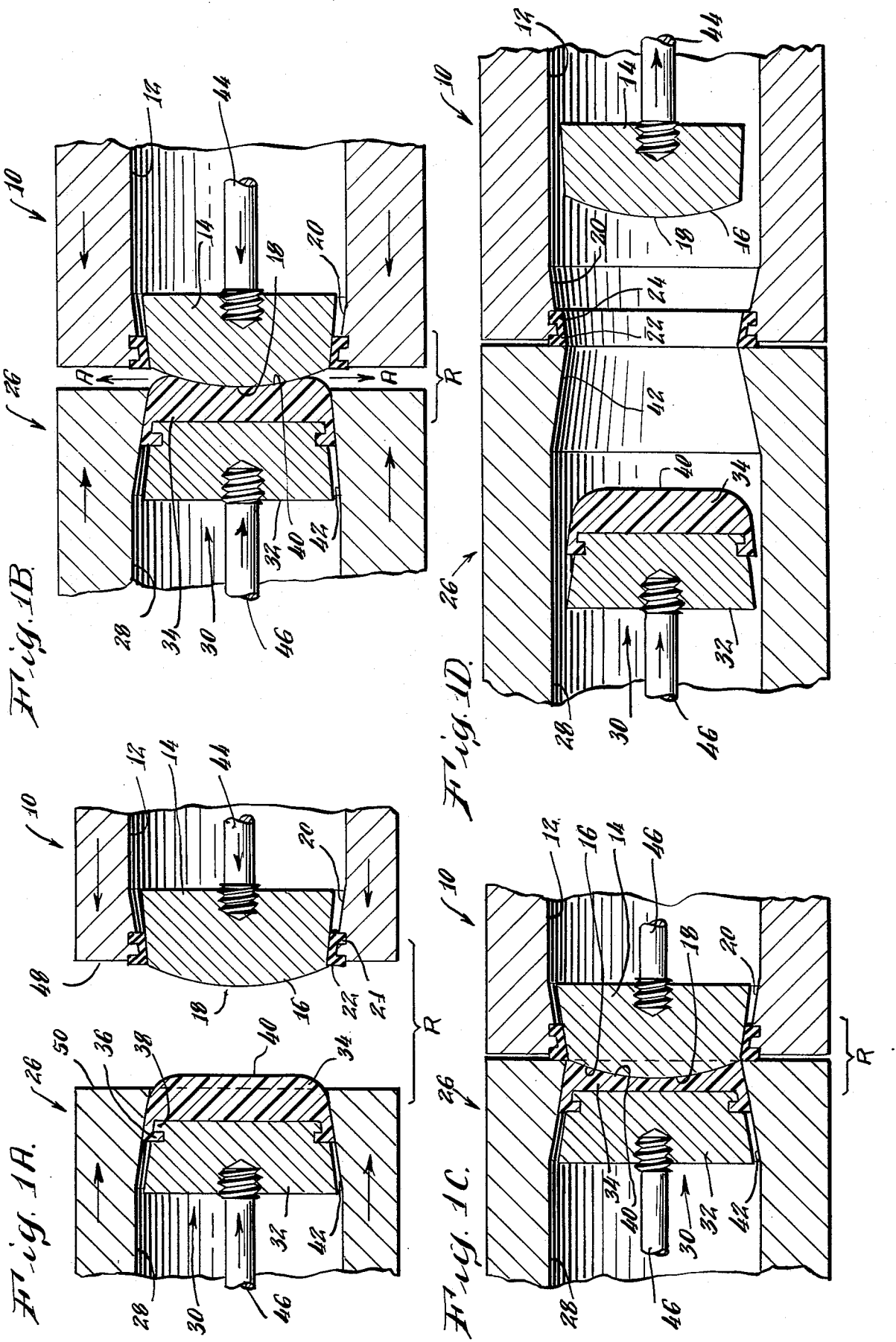

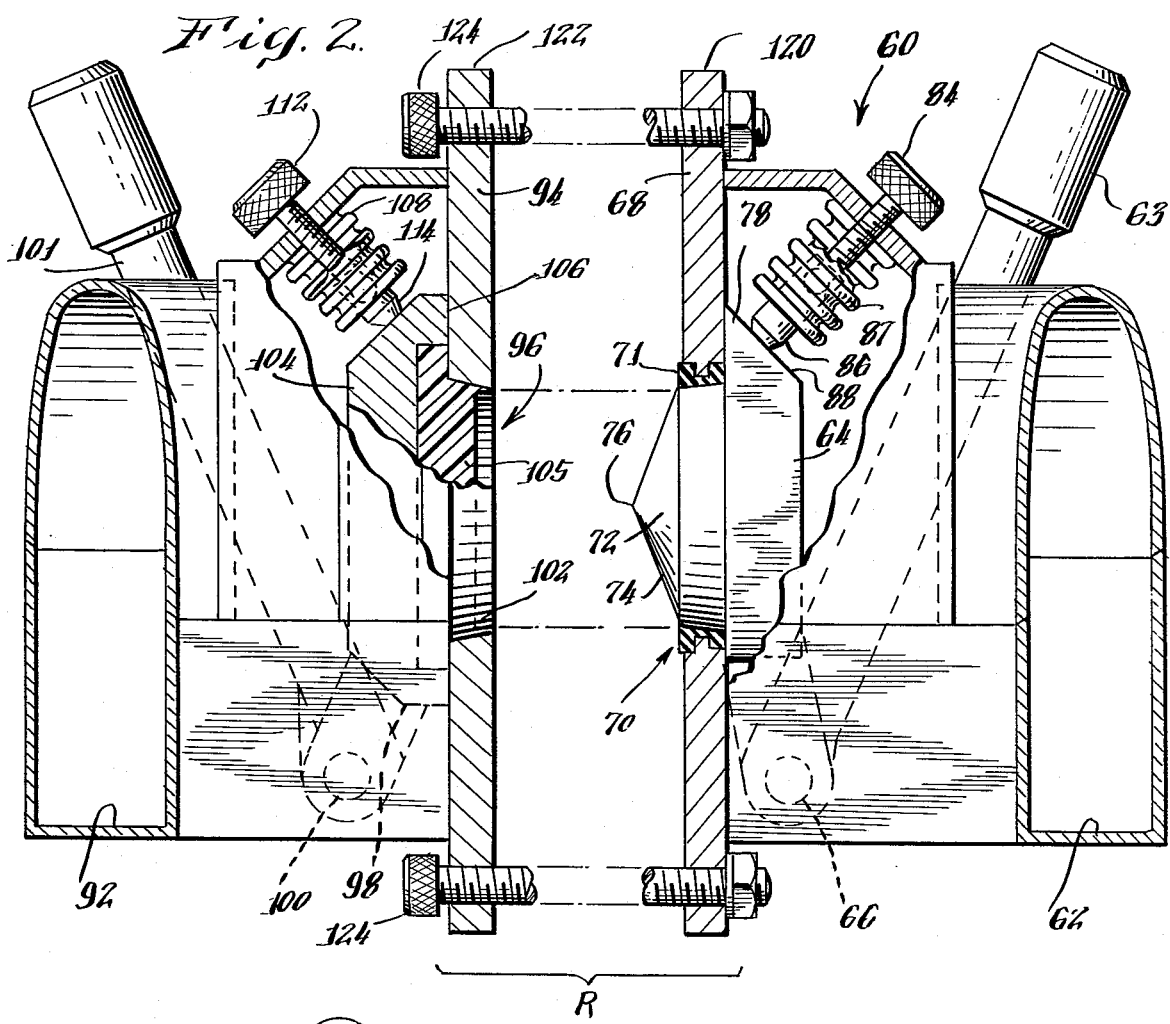
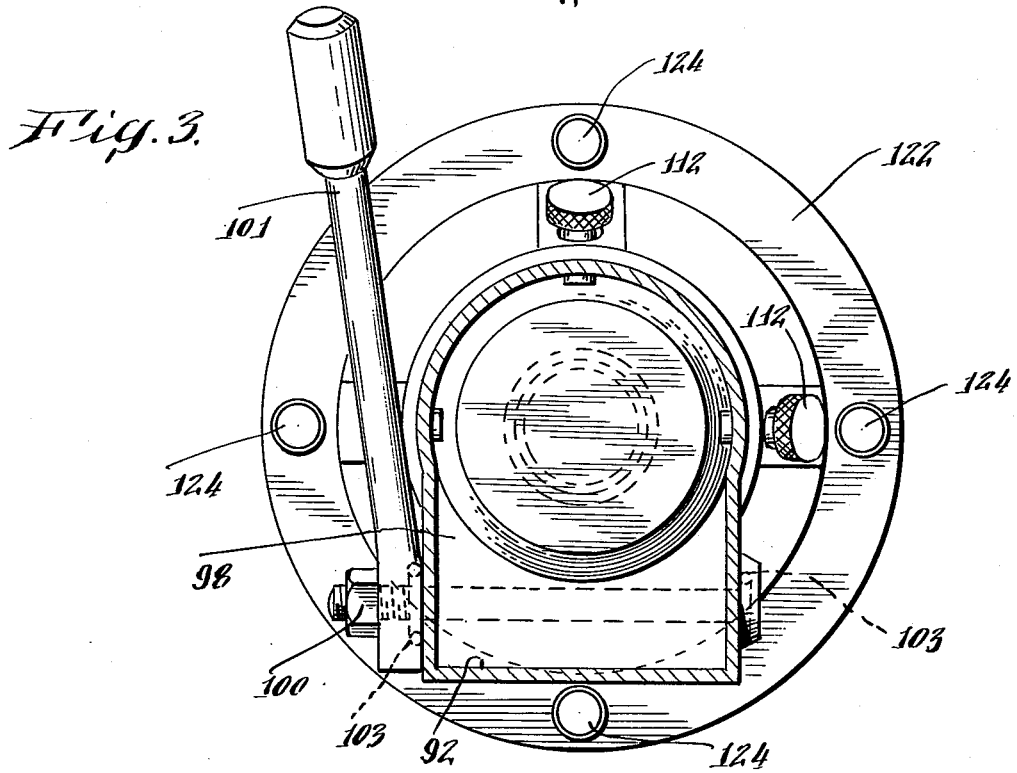

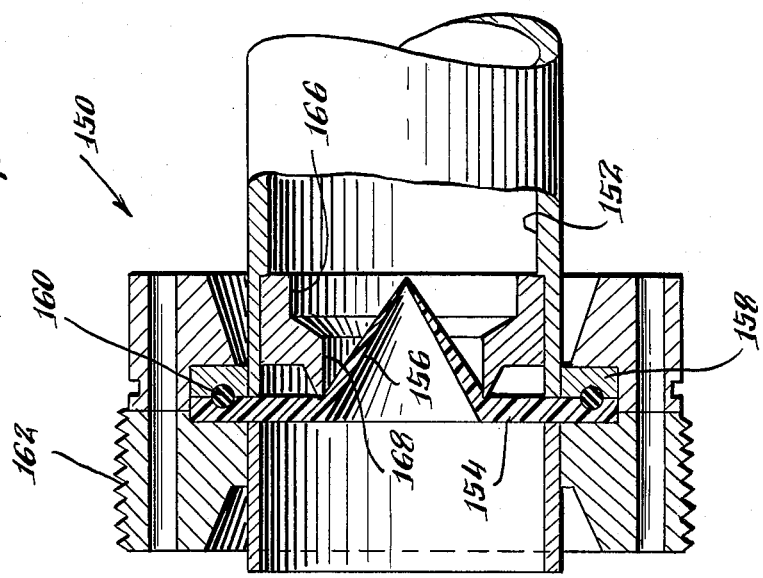
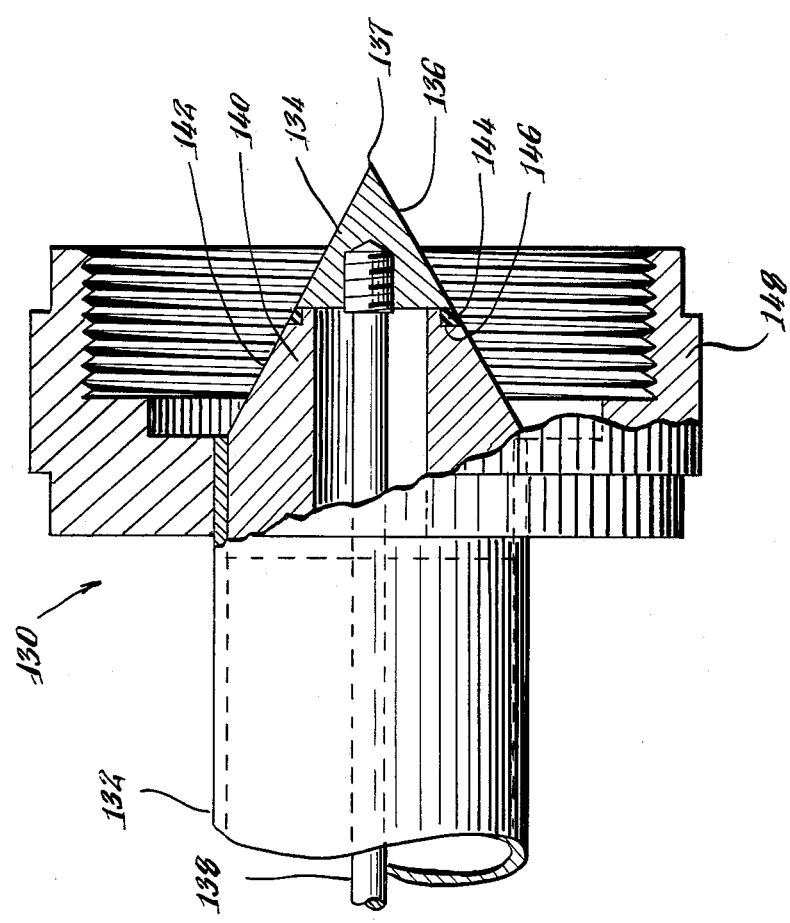

CONNECTOR METHOD AND APPARATUS FOR COUPLING TWO SYSTEMS TOGETHER WHILE EXCLUDING THE ENVIRONMENT FROM THE SYSTEM INTERIORS

BACKGROUND OF THE INVENTION

1. Field of the Invention

The present invention relates to connector method and apparatus for coupling together two systems or combinations of systems, for example, vessels such as pipes, conduits, chambers, tanks or the like to provide intercommunication between them while automatically excluding the environment from the system interiors during and after the coupling operation and while preventing any dilution of or loss of the fluid or vacuum within the interiors of the two respective systems.

In many connector applications it is important to exclude the environment from the interior of the systems being coupled together. For example, electrical cables connected together underwater should be insulated and isolated from the water environment to prevent short circuiting. Interconnection of systems containing volatile or combustible chemicals is desirably accomplished while excluding the atmosphere or air environment to prevent explosion or unnecessary dilution or evaporation. When connecting evacuated systems together it is important to exclude the atmosphere to maintain integrity of the vacuum inside the systems. Conversely, when making connection between systems in an evacuated environment it is important to prevent escape of the atmosphere contained within the systems into the surrounding vacuum, that is, it is important to "exclude" the vacuum of the environment from the atmosphere contained within the systems. Many other applications in which the present invention may be used to advantage are discussed further below.

2. Description of the Prior Art

There have been attempts in the past to interconnect two systems, but these have involved the loss of fluid from within the systems in order to scavenge out the interlocking apparatus or alternatively have required the use of a vacuum pump to scavenge out the interlock. Typically such prior art connectors comprise two valves each mounted on one of two systems to be interconnected. A conduit is connected to each valve; the environment is removed, i.e. pumped out or scavenged, from the interconnecting conduit; and the valves are then both opened to permit flow of the medium contained in the systems therethrough.

For example, to make such a coupling underwater between two tanks, a conduit is first used to interconnect two valves, one valve being associated with each tank. Water is then evacuated or pumped out of the interconnecting conduit and then the valves are finally opened to provide a watertight connection between two tanks. A similar connection may be used between vacuum chambers and necessitates evacuation by laboriously pumping out the interconnecting conduit prior to opening the two vacuum chambers to it.

Prior art interconnection methods and apparatus of the type described above for scavenging or pumping out the environment from the interconnecting conduit between systems are not entirely satisfactory. These prior art interconnections require auxiliary pumps or other scavenging devices to remove the environment from the interconnecting conduit prior to opening the valves to provide flow of the medium between the systems. The interconnection and environment removing operations are time consuming, laborious, complicated and sometimes costly. Also, some of the fluid media within the systems may become lost or wasted in filling up the interconnecting conduit or in scavenging out the intruding environment.

SUMMARY OF THE INVENTION

In accordance with the connector method and apparatus embodying the present invention, two systems or combinations system are enabled to be connected together to provide intercommunication between them while automatically excluding the environment from the sytem interiors during and after the coupling operation and while preventing any dilution or loss of the fluid or vacuum within the respective systems. For example, electron beam welding may be carried on in a vacuum through a connector embodying the invention which excludes the atmospheric environment. Similarly, evacuated microwave chambers may be so connected. Systems used to manufacture integrated circuits may be coupled by environment excluding connectors embodying this invention to control and preserve the characteristics of the interior. Rare gases and cryogenic gases may be transferred through environment excluding connectors embodying this invention. Connectors incorporating this invention may also be used to intercouple media at high pressure or at low pressure and to intercouple media at high temperature or at low temperature.

The connector method and apparatus of the present invention may be used in these applications as well as in any others in which it is desirable to exclude the environment from systems coupled together during and after the coupling operation. Accordingly, the environment excluding connector method and apparatus embodying the present invention are suitable for coupling together systems, for example, vessels such as pipes, conduits, chambers, tanks or the like. As used in this specification, then, the terms "system" or "systems" are intended to be construed to include pipes, tubes, canals, and other conduits, chambers, plenums, tanks, environmentally controlled rooms such as mobile laboratory or hospital rooms, sanitary rooms and any other receptacles or containers which store or confine a medium such as a fluid, vacuum, or any solid, liquid, or gaseous substance, object or article for any purpose.

Connectors embodying the present invention may also be used to couple systems of any size. For example, systems as large as mobile hospital operating rooms may be coupled in a hostile environment to permit people to move between them. Or systems as small as laboratory vacuum tubing may be coupled to confine a vacuum in them.

Further, a wide variety of media may be conducted through the connectors of the present invention. For example, liquids such as water, petroleum, or alcohol, or gases such as air, hydrogen, or helium may be conducted through these connectors. Electrical connection may be made between electrical cables, or other forms of electromagnetic radiation such as radio waves, microwaves, light waves, and X-rays, may be conducted through these connectors. In addition sound waves may be conducted through these connectors. As noted, these connectors may be used to provide passageways for people between such systems as mobile laboratory or hospital or other controlled environment rooms. Thus, the terms "media" or "medium" are intended to be construed to include any solid, liquid, or gaseous substance, object, or article or animals, plants or human beings desirably conducted through a connector which couples two systems such as those described above.

The connectors embodying the present invention advantageously exclude automatically from system interiors any environment including air or other gases, water, or other liquids, and vacuum environments.

In a preferred embodiment to be described below in detail, the connector method and apparatus of the present invention provides a means for coupling together two systems or combinations of systems, for example, vessels such as pipes, conduits, chambers, tanks or the like to provide intercommunication between them while automatically excluding the environment from the system interiors during and after the coupling operation and while preventing any dilution or loss of the fluid or vacuum within the respective systems. This novel coupling method and apparatus eliminates the need for interconnecting two valves, each mounted on one system, with a conduit and later removing or scavenging the environment from the conduit prior to final interconnection of the respective systems. In particular, the method and apparatus of the present invention automatically expel the environment from the region where coupling is accomplished during the coupling operation. Therefore, when final intercommunication between the coupled systems is accomplished, there is no need to remove the environment from the system interconnecting conduit.

One preferred embodiment of the connector apparatus of the present invention includes a male connector element, coupled to a first system, which defines a conduit that communicates with the interior of the first system. This male conduit has a nonplanar sealing surface that forms at least one apex. A female connector element is coupled to a second system and defines a conduit which communicates with the interior of this second system. The female connector element also has a sealing surface and at least one of the male or female connector element sealing surfaces is deformable. The female connector element sealing surface is adapted to engage the nonplanar male connector element sealing surface initially at the male connector apex. Subsequently, when the connector elements are pressed together, deforming the deformable connector element, contact is made between the male and female connector element sealing surfaces at a progressively larger contact area about the male connector apex. The progressive sealing surface engagement from the male connector apex to a larger contact area about this apex progressively expels and excludes the environment from the sealing surface contact area.

Valve means are provided to define an intercommunication between the respective systems after the environment has been excluded and the coupling has been made. In a preferred embodiment, this valve means includes a primary valve mounted at the male connector apex which forms all or a portion of the male connector sealing surface and which lies within the sealing surface contact area when the connector elements are engaged. The primary valve selectively provides communication with the male connector conduit. A secondary valve is mounted in the female connector element and forms all or a portion of the female connector element sealing surface. This secondary valve is disposed to contact the primary valve and provides selective communication with the female connector element conduit. When the respective connector elements are engaged, the respective sealing surfaces in full contact, and the primary and secondary valves opened, intercommunication between the system interiors is completed.

The primary and secondary valves may be hinged or may be mounted on reciprocally mounted actuator rods, or may be mounted and operated in any other conventional fashion.

The method and apparatus of the present invention eliminates the need for expensive auxiliary equipment required to remove the environment from a conventional conduit coupling. Further, the method and apparatus of the present invention is simple to use and therefore requires less time and expense to operate.

Other objects, aspects and advantages of the present invention will be pointed out in, or will be understood from the following detailed description, when considered in conjunction with the accompanying drawings which are briefly described below and which show the presently preferred mode of putting this invention into practice.

BRIEF DESCRIPTION OF THE DRAWINGS

FIGS. 1A through 1D are side cross sectional views of a first embodiment of the connector apparatus of the present invention for coupling two systems while expelling the environment from a coupling region and excluding the environment from the system interiors. Each figure illustrates the components of this embodiment at a subsequent stage in the coupling operation.

FIG. 2 is a side cross sectional view of a second embodiment of the connector apparatus of the present invention. This embodiment of the invention may be coupled and uncoupled repeatedly.

FIG. 3 is an elevational view of the female connector element of this embodiment of the present invention looking toward the right.

FIG. 4 is a side cross sectional view of the male connector element of a third embodiment of the present invention.

FIG. 5 is a side cross sectional view of the female connector element of this third embodiment of the present invention.

DESCRIPTION OF THE PREFERRED EMBODIMENTS

Figure 6:
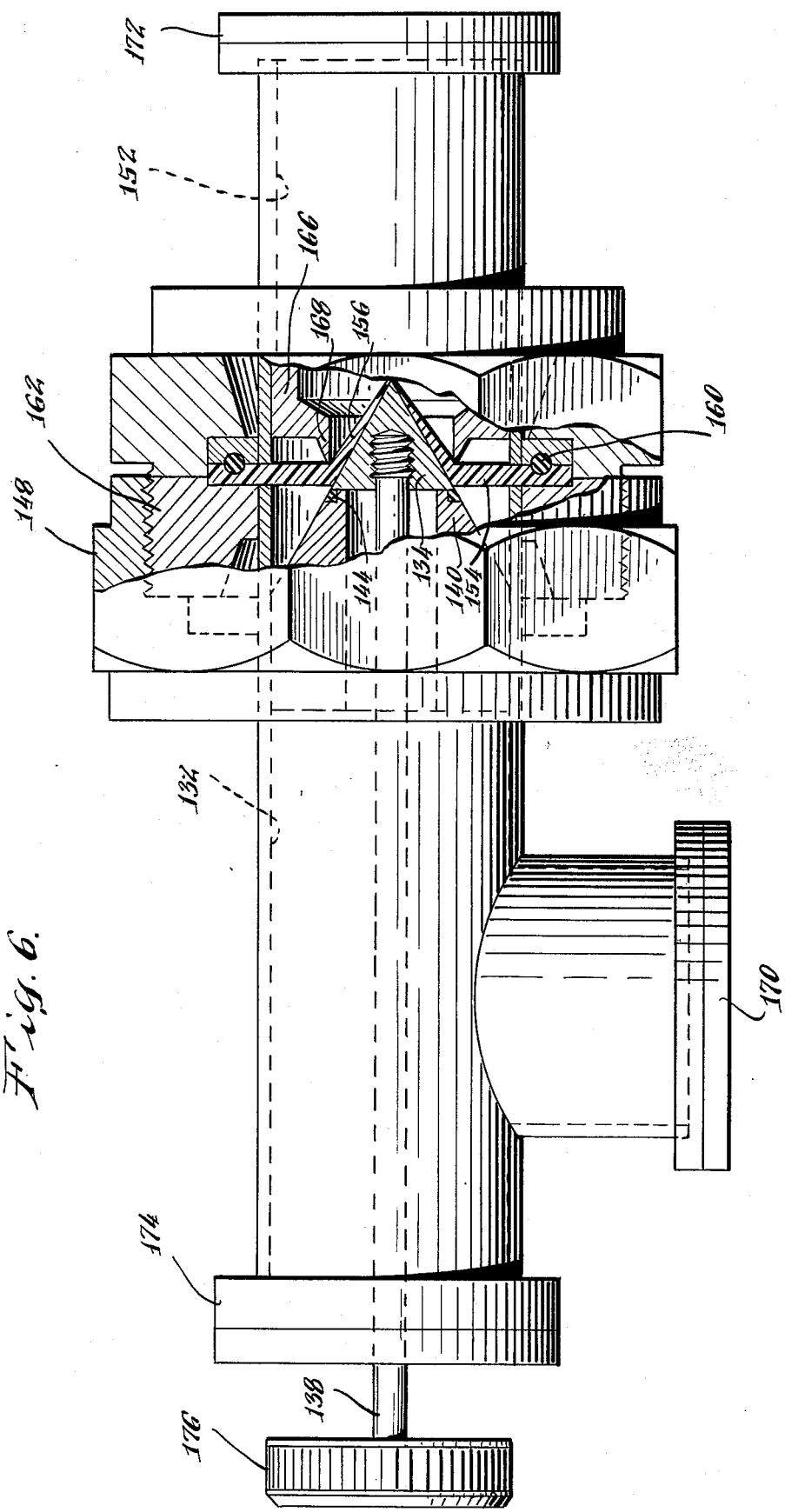
FIG. 6 is a side cross sectional view of the male and female connector element of this third embodiment shown with complete coupling engagement nearly completed. This third embodiment is suitable for use in applications requiring a single permanent connection.

FIGS. 1A through 1D illustrate a first embodiment of the environment expelling and excluding connector of the present invention for coupling two systems together in a coupling region to provide intercommunication between the systems while expelling the environment from the coupling region and excluding the environment from the system interiors during and after the coupling operation. This first embodiment is designed so that it may provide repeated coupling and uncoupling of the two systems.

Referring first to FIG. 1A, this environment expelling and excluding connector includes a male connector element 10, coupled to a first system (not shown), which defines a conduit 12 that communicates with the interior of the first system. A male sealing member 14, having a nonplanar sealing surface 16 that forms at least one high point or apex 18, is reciprocally mounted in the male conduit 12. The sealing surface 16 of this first embodiment is semispherical. As illustrated in FIG. 1A, the mouth of the conduit 12 has a slightly conical section 20 which is provided at its extreme with a resilient ring seal 22 that is C-shaped in cross section. The ring seal 22 is fixed in an annular groove 24 machined in the conical conduit section 20 to hold it in a fixed horizontal position. As shown in FIG. 1A, prior to connector coupling, the ring seal 22 seals the interior of the male connector element conduit 12 by tightly engaging the periphery of the male sealing member 14.

The environment expelling and excluding connector of the present invention further includes a female connector element 26 which is mounted on a second system (not shown) and defines a female conduit 28 that communicates with the interior of this second system. A female sealing member 30, comprising a backing plate 32 and a resilient, deformable sealing block 34 is reciprocally mounted in the female conduit 28. The sealing block 34 has a sealing surface 40 adapted to engage the male sealing member sealing surface 16 in a coupling region R, and may be made of any suitable sealing matter such as rubber or plastic. As shown in FIG. 1A, this sealing block 34 has an inwardly directed, integrally formed flange 36 which engages a similar, complimentary flange 38 formed on the backing plate 32 to hold the sealing block 34 in fixed horizontal relation on the backing plate 32.

The female connector element conduit 28 also has a conical section 42 which mates with the radially outwardly facing portion of the sealing block 34 to tightly seal the interior of the second vessel and the female connector element conduit 28.

The male sealing member 14, and the female backing plate 32 and facing seal 34 are attached to reciprocally operable actuator rods 44 and 46 respectively, the operation of which will be explained in greater detail below.

Both the male and female connector elements 10 and 26 have sealing faces 48 and 50 respectively. As shown in FIG. 1, the ring seal 22 mounted in the male connector element 10 projects a small distance beyond the male connector element sealing face 48.

As noted above, the female connector element sealing surface 40 is adapted to engage the male connector element sealing surface 16, initially at the male connector apex 18. As the connector elements are pressed into tighter interengagement, contact between the connector element sealing surfaces progressively increases about the male connector apex 18. An initial stage of the progressive intercontact is shown in FIG. 1B. This progressive expansion of the contact area from an initial point to a larger area about that point between the connector element sealing surfaces progressively expels and excludes the environment from the contact area as shown by arrows A.

FIG. 1C illustrates the relationship of the male and female connector elements when interengagement between them is complete. At this stage of interengagement, the female connector element sealing block 34 has deformed so that the female connector element sealing surface 40 completely conforms to the male connector element sealing surface 16. By this operation, the environment is completely expelled and excluded from the sealing surface contact area in a progressive manner. Because of the novel shape and operation of the respective male and female sealing surfaces, the environment is expelled from and not trapped in the contact area. Also as illustrated in FIG. 1C, the portion of the ring seal 22 which projects beyond the male connector element sealing face 48 abuts and seals against the female connector element sealing face 50. In this fashion, a tight seal is formed between the male and female connector elements 10 and 26.

Intercommunication between the respective systems is provided after the male and female connector element sealing surfaces and the ring seal and female sealing face are respectively interengaged and the male and female sealing members 14 and 30 are separated by withdrawing the respective actuator rods 44 and 46 outwardly away from the coupling region R, as shown in FIG. 1D. The actuator rods may be operatively associated with manual or automatic actuator devices (not shown) to effect this function. The reciprocally mounted male and female sealing members form primary and secondary valve means between the male and female conduits.

By operating the coupling apparatus of the present invention as described above, tight sealing interengagement between the male and female coupling elements and hence the interiors of the first and second systems may be achieved without the necessity of eliminating or removing that environment from a coupling conduit. The coupling action of the respective male and female sealing elements and the sealing surfaces disposed on each to progressively expel the environment from a progressively, increasingly larger contact area between the coupling elements eliminates the need for an evacuting pump and other ancillary apparatus. Consequently, coupling made with the coupling apparatus of the present invention may be accomplished quickly and inexpensively without complicated operative steps or equipment.

The first embodiment of the environment expelling and excluding connector of the present invention may be used to repeatedly couple and uncouple two systems. To uncouple the systems the sequence of operations described above is reversed. The male and female sealing members 14 and 30 are interengaged in the coupling region R to mate respective male and female sealing surfaces 16 and 40. This is accomplished by operating the actuator rods 44 and 46 to reciprocally press the sealing members into the coupling region R. When complete interengagement is achieved as illustrated in FIG. 1C, the male and female connector elements 10 and 26 may be separated. This permits the environment to progressively reenter the contact area in a fashion opposite to that illustrated by arrows A in FIG. 1B. However, since the male and female sealing members 14 and 30 tightly seal within the connector element conduits 12 and 28, the environment does not enter the respective system interiors. Complete separation may then be accomplished as illustrated in 1A. Accordingly, the systems may be repeatedly coupled and uncoupled by repeating the progression of either the coupling or uncoupling operations.

FIG. 2 is a side cross sectional illustration of a second embodiment of the environment expelling and excluding connector apparatus of the present invention. This embodiment includes a male connector element 60 which defines a conduit 62 attached to and communicating with the interior of a first system (not shown) and which has a male sealing member 64. The male sealing member 64 is hinged at a pivot 66 which may be a bolt that extends through the male connector, is coupled to an actuator lever 63, and is sealed by O-ring seals. A male connector element cover plate 68 is sealingly attached to the mouth of the male connector conduit 62 and is formed with a hole 70 at its center. A gasket seal 71 is mounted at the periphery of this hole 70. The male sealing member 64 is formed with a protruding portion 72 that projects through the hole 70, seals against the gasket seal 71, and defines a nonplanar sealing surface 74 that forms an apex 76. The male sealing member 64 is further formed with a base portion 78 which, at its juncture with the protruding portion 72, forms a flange 80. Clamping means in the form of three manually operated screws 84 are provided to clamp the male sealing member 64 tightly closed. These screws 84 are connected by a ball joint to dog points 86 that are mounted in bellows 87 which are welded to the interior of the conduit 62. The dog points bear against a clamping surface 88 disposed on the male sealing member 84.

This second embodiment of the environment excluding and expelling connector of the present invention also includes a female connector element 90 which defines a conduit 92 that is attached to and communicates with the interior of a second system (not shown). The female connector element 90 has a coverplate 94 which is also formed with a hole 96 at its center. A female sealing member 98 is hinged at a pivot 100 which may also be a bolt that passes through the female connector element conduit 92, is attached to an actuator lever 101, and is sealed by O-ring seals 103 (FIG. 3). This female sealing member 98 has a protruding portion 102 having a sealing surface 105 that projects outwardly into the cover plate hole 96 and further has a base portion 104 which forms a flange 106 at its juncture with the protruding portion 102. The protruding portion 102 is a sealing block made of a deformable resilient material such as rubber or plastic and is firmly attached, for example, with an adhesive, or by vacuum attachment, to the female sealing member base portion 104. A clamping means in the form of three manually operated screws 112 holds the pivotally mounted female sealing member 98 in tight contact with the cover plate 94 so that the flange 106 and the back of the cover plate are firmly interengaged. Each screw 112 has a dog point 114, mounted in a bellows 108, connected by a ball joint to the screw. The bellows 108 is welded to the interior of the conduit 92.

As shown in FIGS. 2 and 3, the male and female coverplates 68 and 94 form flanges 120 and 122 respectfully which project radially beyond the walls of the conduits 62 and 92. Four bolts 124 are provided to draw the respective coverplates 68 and 94 together.

As was the case with the first embodiment of the present invention, the female sealing member sealing surface 105 is adapted to engage the male sealing member sealing surface 74 initially at its apex 76 in a coupling region R. When the bolts 124 are tightened, deformation of the sealing block 102 results, causing the female sealing member sealing surface 105 to conform to the shape of the male sealing member sealing surface 74. The area of contact between the respective sealing surfaces grows progressively larger about the male connector apex 76 as interengagement progresses to expel and exclude the environment from this contact area. When the bolts 124 are drawn tight, the environment is excluded from the entire female sealing surface area and the annular gasket 71 sealingly abuts the male connector element coverplate 68. When this complete sealing member interengagement is achieved the environment is completely expelled and excluded from the sealing surface contact area and the clamping screws 84 and 112 may be loosened to permit the male and female sealing members 64 and 98 to hingedly open about the respective pivots 66 and 100, to permit the media to be transferred between the respective coupled systems. The hingedly mounted male and female sealing members form primary and secondary valve means to provide intercommunication between the system interiors.

This second embodiment of the present invention is similar to the first embodiment of the present invention in that it may be used to repeatedly couple and uncouple two systems. To uncouple the systems without permitting infiltration of the environment into the system interiors, the male and female sealing elements are hingedly closed as shown in FIG. 2. The respective clamping screws 64 and 112 are tightened to ensure a tight seal between the respective coverplates 68 and 94 and the respective sealing members 64 and 98. The bolts 124 may then be loosened, permitting the male and female connector elements 60 and 90 to be separated. These uncoupling and coupling operations described above may be repeatedly performed.

Referring now to FIGS. 4, 5, and 6, a third embodiment of the environment expelling and excluding connector of the present invention is illustrated. This embodiment is suitable for couplings which are made only once since, as will be described below in detail, uncoupling may not be achieved, without permitting infiltration of the environment into the system interiors. Accordingly, this embodiment has utility for applications where it is desirable to make only one connection such as those involving certain vacuum and sanitary systems.

FIG. 4 illustrates in detail a male connector element 130 which defines a conduit 132 that is attached to a first system (not shown) and communicates with the system interior. The male connector element 130 includes a male sealing member 134 having a generally conical shape and defining a male sealing surface 136 forming an apex 137. The male sealing member 134 is carried at the end of an actuator rod 138 which positions the sealing member at the end 140 of the male connector conduit 132. This male connector conduit end 140 is formed with a generally conical surface 142 that coincides with and is an extension of the sealing member sealing surface 136. A ring seal 144 is disposed in an annular rabbet 146 machined at the conduit end 140 and provides a tight seal with the male sealing member 134 when closed as shown in FIG. 4.

The male connector element 130 is further provided with an internally threaded ring collar 148 which forms a means for coupling this connector element to a female connector element.

FIG. 5 illustrates in detail a female connector element 150 which defines a female connector element conduit 152 that is attached to a second system (not shown) and communicates with that system interior. A female sealing member 154 which may be made of a deformable material such as stainless steel, brass, or copper is mounted in the female connector element 150 and has a generally conical sealing surface 156 adapted to engage the male sealing member sealing surface 136. The interior angle of the female conical sealing surface 156 is greater than the internal angle of the male conical sealing surface 136.

The female connector element conduit 152 is formed with a radially outwardly projected flange 158 that is fitted with an O-ring seal 160 on its face to sealingly abut the female sealing member 154 as shown in FIG. 5. An externally threaded collar 162 engages the opposite side of this flange 158 and is adapted to be threaded into the threaded ring collar 148 as shown in FIG. 6.

As shown in FIG. 5, the female connector conduit 152 is formed with an internal annular rabbet 164. A cutting element 166 in the form of a circular knife blade is disposed in this conduit 152 and abuts the base of the annular rabbet 164 to prevent horizontal movement of the cutter element 166 into the conduit. A cutting edge 168 engages the edge of the female sealing member conical sealing surface 156.

The interengagement of the male and female connector elements of this third embodiment of the present invention is shown in greater detail in FIG. 6. When engaged, the respective threaded collars 148 and 162 are threaded one on the other and the male sealing member 134 is engaged in the female sealing member 154. As noted, the interior angle of the female sealing member 154 is greater than that of the male sealing member 134 and, accordingly, initial contact is made at the male sealing member apex 137. As the respective sealing elements are drawn together, the female sealing surface 156 deforms to conform to the male sealing surface 136 in a progressively larger area of contact about the male connector apex 137. Again, the progression from contact at the male connector apex to a larger area of contact about the apex expels and excludes the environment from the contact area.

As shown in detail in FIG. 6, the male and female connector elements are provided with attachment members 170 and 172 respectively. These members provide a convenient means for attaching this third embodiment of the present invention to two systems which are to be coupled together.

As shown in detail in FIG. 6, the actuator rod 138 is carried at its end opposite its attachment to the male sealing member 134 in a threaded cap 174 mounted on the male connector element conduit 132 and in axially spaced relation from the first conduit end 140. A palm wheel 176 is mounted on the end of the actuator rod 138. Rotation of the palm wheel 176 forces the male sealing member 134 away from the first conduit end 140 and further forces the conical portion of the female sealing member 154 into the cutting edge 168 of the cutter element 166.

Figure 7A:
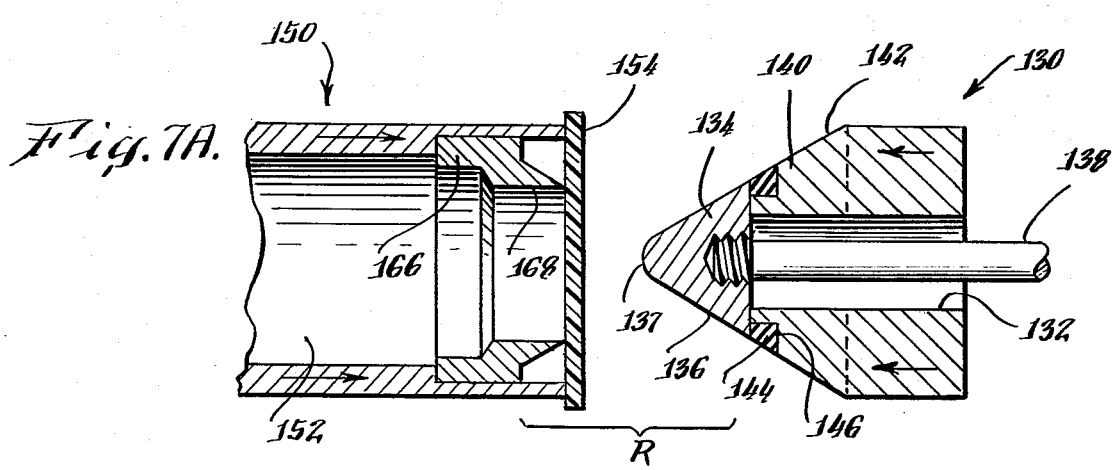
FIGS. 7A through 7D are diagrammatic representations of the third embodiment of the present invention each showing the connector apparatus at subsequent stages of connector element engagement.
Figure 7B:
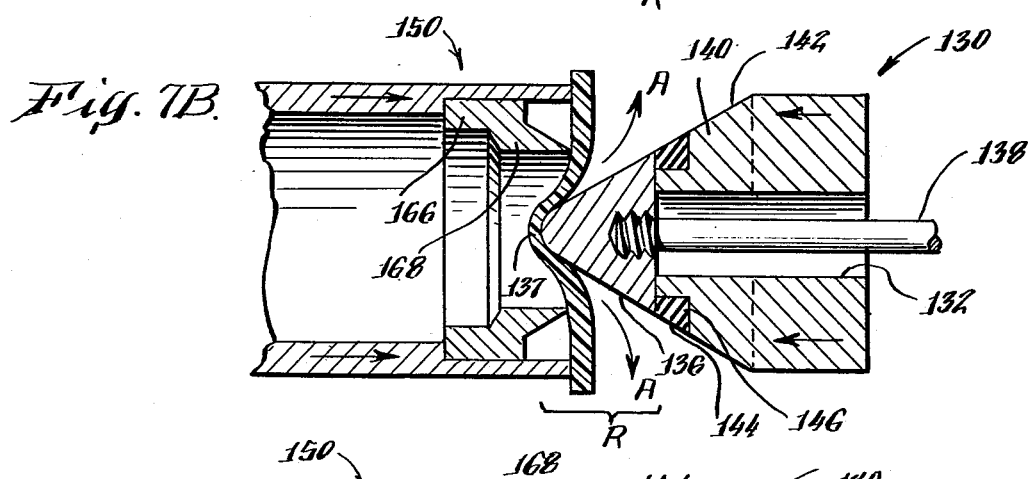
Figure 7C:
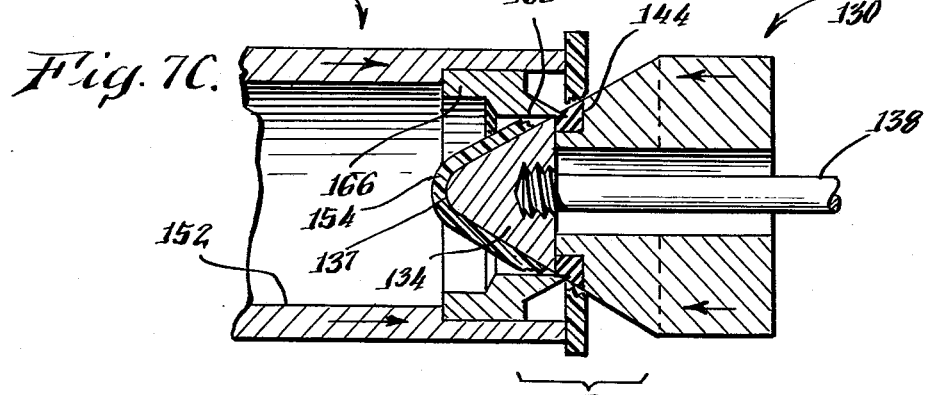
Figure 7D:
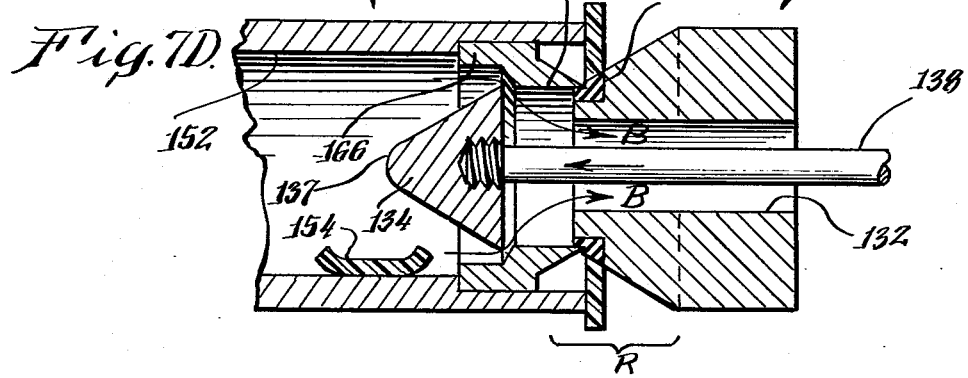

FIGS. 7A through 7D illustrate this operation diagrammatically, the deformation of the female sealing element 154 being exaggerated for charity. FIG. 7A shows the male and female connector elements in a spaced relation. FIG. 7B shows initial contact of the male sealing member 134 with the female sealing member 154 at the male element apex 137. This initial contact gradually grows to a larger contact area about the male connector apex 137 expelling the environment from the contact area as shown by arrows A in FIG. 7B. As coupling is completed, the cutter element cutting edge 168 severs the conical portion of the female sealing member 154. The attitude of these various components is illustrated immediately after severing occurs in FIG. 7C. At this time, the cutter element cutting edge 168 makes sealing contact with the ring seal 144. Finally, with this sealing engagement complete as shown in FIG. 7D, the palm wheel 176 is rotated to push the male sealing member 134 outwardly and to permit the now severed conical portion of the female sealing element 154 to drop into the female connector element conduit 152. This opens a clear passageway from the female connector element conduit 154 into the male connector element conduit 132 as indicated by arrows B. Thus the reciprocally movable male sealing member forms a primary valve means and the severed female sealing member forms a secondary valve means.

As noted, this third embodiment of the present invention is not suitable for repeated coupling and uncoupling because the female connector sealing member is severed by the cutting element.

The apparatus of the present invention may be desirably constructed with one or both of the male and female sealing surfaces being nonplanar. Further, one or both of these sealing surfaces may be made of a deformable material.

A valve means such as those described for providing intercommunication between the male and female conduits or another valve means such as one arranged for swinging, transverse sliding, or translational movement may be employed.

Although specific embodiments of the present invention have been disclosed above in detail, it is to be understood that this is for purposes of illustration only. This disclosure is not to be construed as limiting the scope of the invention since the described method of operation and structure of the present invention may be changed in details by those skilled in the art in order to adapt the method and coupling apparatus for coupling two systems together in a coupling region while expelling the environment from this coupling region and excluding the environment from the systems' interiors, without departing from the scope of the following claims.

I claim:

1. An environment expelling and excluding connector for coupling two systems for example, vessels such as pipes, conduits, chambers, tanks, or the like, together in a coupling region to provide intercommunication therebetween while expelling the environment from the coupling region and excluding the environment from the system interiors during and after the coupling operation, said connector comprising:

a male connector element coupled to a first system defining a first conduit which communicates with the first system interior;

said first conduit having a mouth;

said male connector element having a nonplanar sealing surface for sealing the mouth of said first conduit when the systems are uncoupled, said sealing surface forming at least one apex;

a female connector element coupled to a second system defining a second conduit which communicates with the second system interior;

said second conduit having a mouth;

said female connector element having a sealing surface for sealing the mouth of said second conduit when the systems are uncoupled;

at least one of said male or female connector sealing surfaces being deformable;

said female connector sealing surface being adapted to engage said male connector sealing surface initially at said male connector apex and subsequently upon progressive deformation of the deformable sealing surface, at a progressively larger contact area about the male connector apex for thereby expelling and excluding the environment from this contact area until the contact area between said sealing surfaces extends completely across the mouths of both conduits for completely excluding the environment from the coupling region;

said connector joining the conduits together in sealed relationship after said contact area between said sealing surfaces has extended completely across the mouths of both conduits; and valve means for providing an opening communicating between said conduits through the coupling region after said conduits have been joined together in said sealed relationship, whereby the system interiors are placed in intercommunication through said connector while excluding the environment from the system interiors during and after the coupling operation.

2. The environment expelling and excluding connector for coupling two systems together while excluding the environment from the system interiors during and after the coupling operation, as claimed in claim 1 wherein said male and female connector element sealing surfaces are generally conical, said female connector element sealing surface having a greater interior angle than said male connector element conical sealing surface.

3. The environment expelling and excluding connector for coupling two systems together while excluding the environment from the system interiors during and after the coupling operation, as claimed in claim 2 wherein said male connector element sealing surface is deformable and deforms to conform to the female connector sealing surface when engaged thereby.

4. The environment expelling and excluding connector for coupling two systems together while excluding the environment from the system interiors during and after the coupling operation, as claimed in claim 2 wherein said female connector element sealing surface is deformable and deforms to conform to male connector element sealing surface when engaged thereby.

5. The environment expelling and excluding connector for coupling two systems together while excluding the environment from the system interiors during and after the coupling operation, as claimed in claim 1 wherein said valve means comprises:

a primary valve mounted at said male connector apex forming at least a portion of said male connector sealing surface which lies within the sealing surface contact area when said connector elements are engaged; said primary valve selectively providing communication with said male connector conduit; and means for opening the portion of said female connector element which contacts said primary valve to provide communication between said male and female connector element conduits.

6. The environment expelling and excluding connector for coupling two systems together while excluding the environment from the system interiors during and after the coupling operation, as claimed in claim 5 wherein said primary valve comprises a sealing member mounted for reciprocal movement into and out of said coupling region to selectively open and close said male connector conduit.

7. The environment expelling and excluding connector for coupling two systems together while excluding the environment from the system interiors during and after the coupling operation, as claimed in claim 5, wherein said primary valve comprises a sealing member mounted for hinged, pivoted movement into and out of said coupling region to selectively open and close said male connector conduit.

8. The environment expelling and excluding connector for coupling two systems together while excluding the environment from the system interiors during and after the coupling operation, as claimed in claim 5 wherein said means for opening said female connector element comprises:

cutting means for cutting away and thus opening the portion of said female connector element which contacts said primary valve.

9. The environment expelling and excluding connector for coupling two systems together while excluding the environment from the system interiors during and after the coupling operation, as claimed in claim 5 wherein said means for opening said female connector element comprises:

a secondary valve mounted in said female connector element forming at least a portion of said female connector element sealing surface which contacts said primary valve for selectively providing communication with said female connector element conduit, whereby said primary and secondary valves open to provide communication between said male and female connector conduits.

10. The environment expelling and excluding connector for coupling two systems together while excluding the environment from the system interiors during and after the coupling operation, as claimed in claim 9 wherein said secondary valve comprises a sealing member mounted for reciprocal movement into and out of said coupling region to selectively open and close said female connector conduit.

11. The environment expelling and excluding connector for coupling two systems together while excluding the environment from the system interiors during and after the coupling operation, as claimed in claim 9 wherein said secondary valve comprises a sealing member mounted for hinged, pivoted movement into and out of said coupling region to selectively open and close said female connector conduit.

12. Apparatus for making an interconnection between the initially separate interior regions of two vessels for providing communication between said interior regions while excluding the environment from and preventing the entry of the environment into said interior regions during and after the interconnection of said vessels comprising:

first connector means defining a first conduit for communication with the interior of a first vessel, said first conduit having a mouth, second connector means defining a second conduit for communicating with the interior of a second vessel, said second conduit having a mouth, said first connector means including a first sealing member which seals the mouth of said first conduit for excluding the environment from said first conduit when said first and second connector means are in disconnected relationship, said second connector means including a second sealing member which seals the mouth of said second conduit for excluding the environment from said second conduit when said first and second connector means are in disconnected relationship, at least one of said sealing members being deformable, at least one of said sealing members having at least one high point, said first and second connector means being adapted to be connected together with the high point of one of the sealing members initially coming into contact against the other sealing member when beginning to make an interconnection utilizing said first and second connector means, said deformable sealing member becoming progressively deformed as the mouths of said first and second conduits are moved toward each other for progressively enlarging the area of contact between said sealing members for excluding the environment from the enlarging area of contact therebetween until said enlarging area of contact extends fully across the mouths of both of said conduits at which time said conduit mouths become joined together in sealed relationship with the environment excluded from both conduits, and means for providing communication between the conduits after they have been joined together in sealed relationship for completing the communication between the two sealed-together conduits, whereby the environment was excluded from both conduits during and after the making of the interconnection, thereby enabling the interior region of two vessels to be interconnected while excluding the environment from both interior regions during and after the making of the interconnection.

13. Apparatus for making an interconnection between the initially separate interior regions of two vessels as claimed in claim 12, in which:
said means for providing communication between the conduits joined together in sealed relationship comprises:
means for withdrawing the first and second sealing members from the mouths of the first and second conduits after said conduits have been joined together in sealed relationship.

14. Apparatus for making an interconnection between the initially separate interior regions of two vessels as claimed in claim 12, in which:
said means for providing communication between the conduits joined together in sealed relationship includes:
means for cutting an opening through one of the sealing members after said conduits have been joined together in sealed relationship, and
means for moving at least part of the other sealing member away from such cut opening.

15. Apparatus for making an interconnection between the initially separate interior regions of two vessels as claimed in claim 14, in which:
the opening is cut through the deformable sealing member.

16. Apparatus for making an interconnection between the initially separate interior regions of two vessels as claimed in claim 14, in which:
the sealing member having at least one high point serves to deform the other sealing member which is deformable, and
said means for providing communication between the conduits joined together in sealed relationship includes:
a cutting element near the deformable sealing member for cutting an opening through the deformable sealing member after the conduits have been joined together in sealed relationship, and means for moving the high point of said other sealing member through such cut opening for clearing said opening.

17. Apparatus for making an interconnection between the initially separate interior regions of two vessels as claimed in claim 12, in which:
said first and second conduits taper inwardly toward smaller diameters at their respective mouths and said sealing members are intially positioned within the tapered portions of said conduits, and
said means for providing communication between the conduits after they have been joined together in sealed relationship includes:
means for withdrawing the respective sealing members back away from said tapered portions of the conduits for opening the respective mouths of the joined conduits.

18. Apparatus for making an interconnection between the initially separate interior regions of two vessels as claimed in claim 12, in which:
the first and second connector means can be disconnected for again separating the interior regions of the two vessels while excluding the environment and while also preventing loss from the interiors of the two vessels by reversing the sequence of their respective operation.

19. Environment excluding connector apparatus for coupling together two systems in sealed relationship therebetween to provide intercommunication for media to pass between them comprising:
a first connector defining a first conduit having a first mouth, said first conduit being adapted to communicate with the interior of a first system,
a second connector defining a second conduit having a second mouth, said second conduit being adapted to communicate with the interior of a second system,
said first and second connectors being interconnectible for coupling together said conduits,
said first connector including first sealing means for normally sealing said first mouth before said connectors are interconnected,
said second connector including second sealing means for normally sealing said second mouth before said connectors are interconnected,
said first sealing means providing a male sealing surface having a high point,
said second sealing means providing a second sealing surface engageable with said male sealing surface with the initial area of contact between said sealing surfaces occurring at said high point when said connectors are being moved toward each other with their sealed mouths facing toward each other for commencing a coupling operation,
at least one of said sealing surfaces being deformable for progressively enlarging the area of contact therebetween outwardly from said initial area as said connectors are moved progressively closer for completely expelling the environment from the region between said mouths before said mouths are brought fully together,
at least one movable member in one of said connectors and being movable with respect to said one connector for opening an intercommunicating passage between said conduits and passing through their mouths after said mouths have been brought fully together in sealed relationship, whereby the environment is completely excluded from the interiors of said conduits during and after the coupling operation to prevent dilution or contamination of the media passing between them and whereby any losses from the interiors of said conduits are prevented during and after the coupling operation.

20. Environment excluding connector apparatus for coupling together two systems in sealed relationship therebetween to provide intercommunication for media to pass between them as claimed in claim 19, in which:
    said movable member is a valve member which is retractable into said one connector after said mouths have been brought fully together in sealed relationship.

21. Environment excluding connector apparatus for coupling together two systems in sealed relationship therebetween to provide intercommunication for media to pass between them as claimed in claim 19, in which:
    said movable member serves to force an opening through said deformable sealing surface after said mouths have been brought fully together in sealed relationship.

22. Environment excluding connector apparatus for coupling together two systems in sealed relationship therebetween to provide intercommunication for media to pass between them as claimed in claim 19, in which:
    said high point is centrally located with respect to said male sealing surface for providing said initial area of contact at the central location of said high point, and
    said enlarging are of contact proceeds progressively outward from said central location for expelling the environment.

23. Environment excluding connector apparatus as claimed in claim 19 in which:
    at least one of said connectors has a seal encircling its mouth and positioned immediately adjacent to said mouth for engaging the other connector is sealing relationship, encircling the mouth of the other connector and immediately adjacent thereto after the environment has been expelled from the region between said mouths.

* * * * *